(12) United States Patent
Mitsueda et al.

(10) Patent No.: US 7,251,551 B2
(45) Date of Patent: Jul. 31, 2007

(54) ON-VEHICLE ELECTRONIC CONTROL DEVICE

(75) Inventors: Hiroyuki Mitsueda, Tokyo (JP); Katsuya Nakamoto, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/860,589

(22) Filed: Jun. 4, 2004

(65) Prior Publication Data
US 2005/0085967 A1    Apr. 21, 2005

(30) Foreign Application Priority Data
Sep. 24, 2003   (JP) .............................. 2003-331895

(51) Int. Cl.
  G06F 11/00   (2006.01)
  G06F 19/00   (2006.01)
(52) U.S. Cl. .................... 701/29; 701/30; 701/33; 701/35; 701/36; 701/114; 714/23; 714/31; 714/51; 714/55; 700/2; 700/3; 700/4; 700/26
(58) Field of Classification Search .............. 701/1, 701/29, 30, 33–36, 102, 114, 115, 48; 714/10–12, 714/23, 25, 30, 33, 31, 51, 52–55
See application file for complete search history.

(56) References Cited

U.S. PATENT DOCUMENTS

| 5,481,456 A * | 1/1996 | Ogura ........................... 701/1 |
| 5,526,267 A * | 6/1996 | Sogawa ...................... 701/114 |
| 5,812,880 A * | 9/1998 | Goto et al. ................... 710/37 |
| 6,216,084 B1 | 4/2001 | Uematsu et al. |
| 6,230,094 B1 | 5/2001 | Ohashi et al. |
| 6,240,534 B1 * | 5/2001 | Nakane ....................... 714/55 |
| 6,745,120 B2 * | 6/2004 | Iwagami et al. ............ 701/114 |
| 6,883,123 B2 * | 4/2005 | Hashimoto et al. ........... 714/55 |
| 6,915,192 B2 * | 7/2005 | Hashimoto et al. ........... 701/35 |
| 2002/0040261 A1 | 4/2002 | Nakamoto et al. |

FOREIGN PATENT DOCUMENTS

| GB | 2 258 058 A | 1/1993 |
| JP | 5-81222 A | 4/1993 |
| JP | 5-128065 A | 5/1993 |

(Continued)

*Primary Examiner*—Jack Keith
*Assistant Examiner*—Chuong Nguyen
(74) *Attorney, Agent, or Firm*—Sughrue Mion, PLLC

(57) ABSTRACT

An on-vehicle electronic control device includes an auxiliary microprocessor and subjects a microprocessor allocated to a main part of control to an external diagnosis, thereby improving reliability of performance. A microprocessor including a nonvolatile program memory into which a control program is written is serially connected to an auxiliary microprocessor including an auxiliary nonvolatile program memory. The microprocessor and the auxiliary microprocessor function in cooperation to control on-vehicle electric load groups in response to input signals from on-vehicle sensor groups and on-vehicle analog sensor group. The nonvolatile program memory and the microprocessor are subjected to runaway monitoring performed by a watchdog timer and to an external checksum diagnosis performed periodically by the auxiliary microprocessor. If an anomaly occurs in the runaway monitoring, the external checksum diagnosis, and a checksum interval, parts of electric loads are cut off of power supply by load power relay.

17 Claims, 7 Drawing Sheets

FOREIGN PATENT DOCUMENTS

| | | |
|---|---|---|
| JP | 6-259267 A | 9/1994 |
| JP | 7-13912 A | 1/1995 |
| JP | 7-269409 A | 10/1995 |
| JP | 8-339308 A | 12/1996 |
| JP | 2000-242528 A | 9/2000 |
| JP | 2001-202129 A | 7/2001 |
| JP | 2001-202266 A | 7/2001 |
| JP | 2001-227402 A | 8/2001 |

* cited by examiner

FIG. 2A

M-ROM 200

| ADDRESS | DATA |  |  |
|---|---|---|---|
|  | D0 | D1 ... b* | ... b0 |
| A0 | INTERNAL CHECKSUM INSTRUCTION | | | — 201
| A1 | CALCULATION INSTRUCTION | | | — 202
| — | TRIAL CALCULATION FORMULA DATA AUGEND 10H ADDEND 20H | | | — 203
| — | CORRECT ANSWER DATA ADDEND VALUE 30H | | | — 204
| — | CALCULATION COMPARISON PROGRAM RECEIVED VALUE = 30H? | | | — 205
| — | EXTERNAL CHECKSUM INSTRUCTION | | | — 206
| — | EXTERNAL COLLATION DATA CRYPTOGRAPHIC NUMBER C | | | — 207
| — | EXTERNAL SUM COMPARISON OPERATION PROGRAM RECEIVED VALUE = C? | | | — 208
| — | INPUT/OUTPUT PROCESSING PROGRAM TRANSMISSION/RECEPTION PROGRAM OUTPUT CONTROL PROGRAM | | | — 209
| Am-1 | Dm-1 | | |
| Am | $\Sigma D(0 \sim m-1)$ | | | — 210

FIG. 2B

F-MEM 220

| ADDRESS | DATA |  |  |
|---|---|---|---|
|  | D0 | D1 ... b* | ... b0 |
| A0 | — | | |
| A1 | — | | |
| — | INTERNAL CHECK PROGRAM $\Sigma D(0 \sim n)=0$ OR $\Sigma D(0 \sim n-1)=C$ | | | — 221
| — | TRIAL CALCULATION EXECUTION PROGRAM 10H+20H= | | | — 222
| — | EXTERNAL SUM OPERATION PROGRAM OR $\Sigma D(0 \sim n-1)=C$ | | | — 223
| — | FUNCTION CONVERSION PROGRAM $C-\Sigma D(0 \sim n-2)$ | | | — 224
| — | RUNAWAY MONITORING PROGRAM | | | — 225
| — | INPUT/OUTPUT PROCESSING PROGRAM TRANSMISSION/RECEPTION PROGRAM OUTPUT CONTROL PROGRAM | | | — 226
| An-2 | Dn-2 | | |
| An-1 | $C-\Sigma D(0 \sim n-2)$ | | | — 227
| An | INTERNAL CHECKSUM COLLATION DATA $S2=\Sigma D(0 \sim n-1)$ | | | — 228

ON-VEHICLE ELECTRONIC CONTROL DEVICE

BACKGROUND OF THE INVENTION

1. Field of the Invention

The present invention relates to an on-vehicle electronic control device, for example, an electronic control device incorporating a microprocessor used for performing fuel supply control for a vehicle engine, control of a throttle valve for air supply, or the like.

2. Description of the Related Art

In such an on-vehicle electronic control device as described above, as an anomaly diagnosis for a microprocessor that functions in cooperation with a program memory, runaway of the microprocessor is monitored using a watchdog timer, and program anomalies are monitored using a checksum.

Also, in an on-vehicle electronic control device equipped with an auxiliary microprocessor that is serially connected to the above-mentioned microprocessor and functions in cooperation with the microprocessor, a checksum is also performed on send/receive data in order to check communication data.

Up to now, there is proposed an "on-vehicle electronic control device" in which in order to self-check contents of a control program for a microprocessor by the microprocessor, the control program is divided into a plurality of segments to perform a checksum, thereby reducing a processing load of the microprocessor (see, for example, JP 2001-227402 A).

However, according to JP 2001-227402 A, there is a problem of degraded reliability in that an anomaly diagnosis for a program in question is performed based on the self-checking by the program in question per se. In addition, it is not guaranteed that the checksum is executed on a regular basis.

Up to now, there is proposed a "duplex asynchronous microcomputer system fault detector" in which a pair of microcomputers perform a checksum on one another, and upon detection of anomalies, stop watchdog signals corresponding to respective watchdog timers to cut off control outputs (see, for example, JP 06-259267 A).

According to JP 06-259267 A, there is a problem in that mutual transmission of data for a checksum cause an increase of input/output points of both the microcomputers. In addition, it is not guaranteed that the checksum is executed on a regular basis.

Further, up to now, there is proposed a "method of monitoring operations of two CPUs" which causes a system composed of two CPUs, a main CPU and a sub-CPU, to perform the following operations (see, for example, JP 05-081222 A). That is, in the case where the main CPU runs away out of control or is disabled, the two CPUs are both initiated and reactivated in response to a reset signal outputted from a watchdog timer circuit that is externally provided. In the case where the sub-CPU runs away out of control or is disabled, the main CPU monitors the fault, and a reset signal is outputted from the main CPU to the sub-CPU to initiate and reactivate the sub-CPU.

According to JP 05-081222 A, there is a problem in that if a microcomputer is reactivated in response to a reset pulse, a vehicle driver cannot recognize temporal occurrence of runaway of the microprocessor.

Meanwhile, up to now, there is proposed a "digital processor" in which when an anomaly is detected in a microcomputer by a watchdog timer, the operation of the microcomputer is completely stopped, and in order to recover the microcomputer, it is only after temporarily cutting off operational power supply to the microcomputer that the power is supplied again for the recovery (see, for example, JP 08-339308 A).

In this case, the microcomputer is not reactivated until a vehicle driver opens/closes a power switch. Thus, the above-mentioned digital processor has a feature that the vehicle driver can recognize the anomaly occurring in the microprocessor.

However, there is an inconvenience that a temporal malfunction due to noise forces a vehicle into stopping.

Further, up to now, there are proposed techniques related to the above such as an "input and output processing IC" (see, for example, JP 07-013912 A) and a "data communication equipment" (see, for example, JP 05-128065 A). JP 07-013912 A and JP 05-128065 A show that a microprocessor is serially connected with an input/output circuit and a slave microprocessor, respectively, and refer to a checksum with respect to serial communication data.

Also, there is proposed an "on-vehicle electronic control device" which relates to a pair of microprocessors performing serial communication with each other, and includes checksum means for communication data (see, for example, JP 07-269409 A).

The respective publications cited above relate strictly to a checksum involving communication data, and not to a checksum with respect to contents of a program memory.

All of the conventional techniques as described above have a problem in that cooperation and function allocation are not sufficiently realized when performing runaway monitoring and a checksum for a microprocessor and a program memory, and the functions individually processed fail to guarantee sufficient reliability of performance.

SUMMARY OF THE INVENTION

The present invention has been made in order to solve the above-mentioned problems, and therefore has an object to obtain an on-vehicle electronic control device including a concurrent control circuit serially connected to a microprocessor, which subjects the microprocessor allocated to a main part of control to an external diagnosis, thereby improving reliability of performance.

With the above object(s) in view, an on-vehicle electronic control device according to the present invention includes a nonvolatile program memory for storing a control program and a control constant and a microprocessor which is connected to a first serial-parallel converter via a bus; and a concurrent control circuit that is serially connected to the microprocessor via a second serial-parallel converter. The microprocessor and the concurrent control circuit function in cooperation to control an on-vehicle electric load group based on input signals from an on-vehicle sensor group and contents of the nonvolatile program memory. The on-vehicle electronic control device includes a watchdog timer into which a watchdog signal formed of a generated pulse train outputted by the microprocessor is inputted and which, when a pulse width of the watchdog signal is equal to or larger than a predetermined value, generates a reset pulse to reactivate the microprocessor. The on-vehicle electronic control device also includes a nonvolatile collation information storage unit that is connected to the concurrent control circuit via a bus and previously stores predetermined checksum external collation data. The on-vehicle electronic control device includes external checksum means for comparing current sum data that concerns data stored in the nonvolatile program memory and is transmitted to the concurrent control circuit from the microprocessor with the checksum external collation data that is previously stored in the collation information storage unit, and generating an anomaly detection output based on a result of comparison being "non-coincidence". The on-vehicle electronic control device includes interval monitoring means for generating the anomaly detection output when a time interval for execution by the external checksum means exceeds a predetermined time. The on-vehicle electronic control device also includes load group stopping means for stopping a partial drive of the on-vehicle electric load group in response to the anomaly detection output from at least one of the external checksum means and the interval monitoring means.

As described above, the on-vehicle electronic control device according to the present invention includes: the concurrent control circuit that is serially connected to the microprocessor connected to the nonvolatile program memory via the bus; the watchdog timer; the collation information storage unit; the external checksum means; and the interval monitoring means. As a result, external runaway monitoring can be doubly performed on the microprocessor itself by the watchdog timer and the concurrent control circuit. Also, an external checksum can be performed on the nonvolatile program memory functioning in cooperation with the microprocessor. In addition to the external checksum, indirect communication check can be performed as to whether the concurrent control circuit undergoes normal communication or not. Accordingly, improvement is achieved for the reliability of the microprocessor, the nonvolatile program memory, and the concurrent control circuit.

BRIEF DESCRIPTION OF THE DRAWINGS

In the accompanying drawings:

FIG. 2A is an explanatory diagram showing a main memory map of an auxiliary nonvolatile program memory provided to the on-vehicle electronic control device shown in FIG. 1;

FIG. 2B is an explanatory diagram showing a main memory map of a nonvolatile program memory provided to the on-vehicle electronic control device shown in FIG. 1;

DETAILED DESCRIPTION OF THE PREFERRED EMBODIMENTS

Embodiment 1

Hereinafter, referring to FIG. 1, description will be made of an on-vehicle electronic control device according to Embodiment 1 of the present invention.

Figure 1:
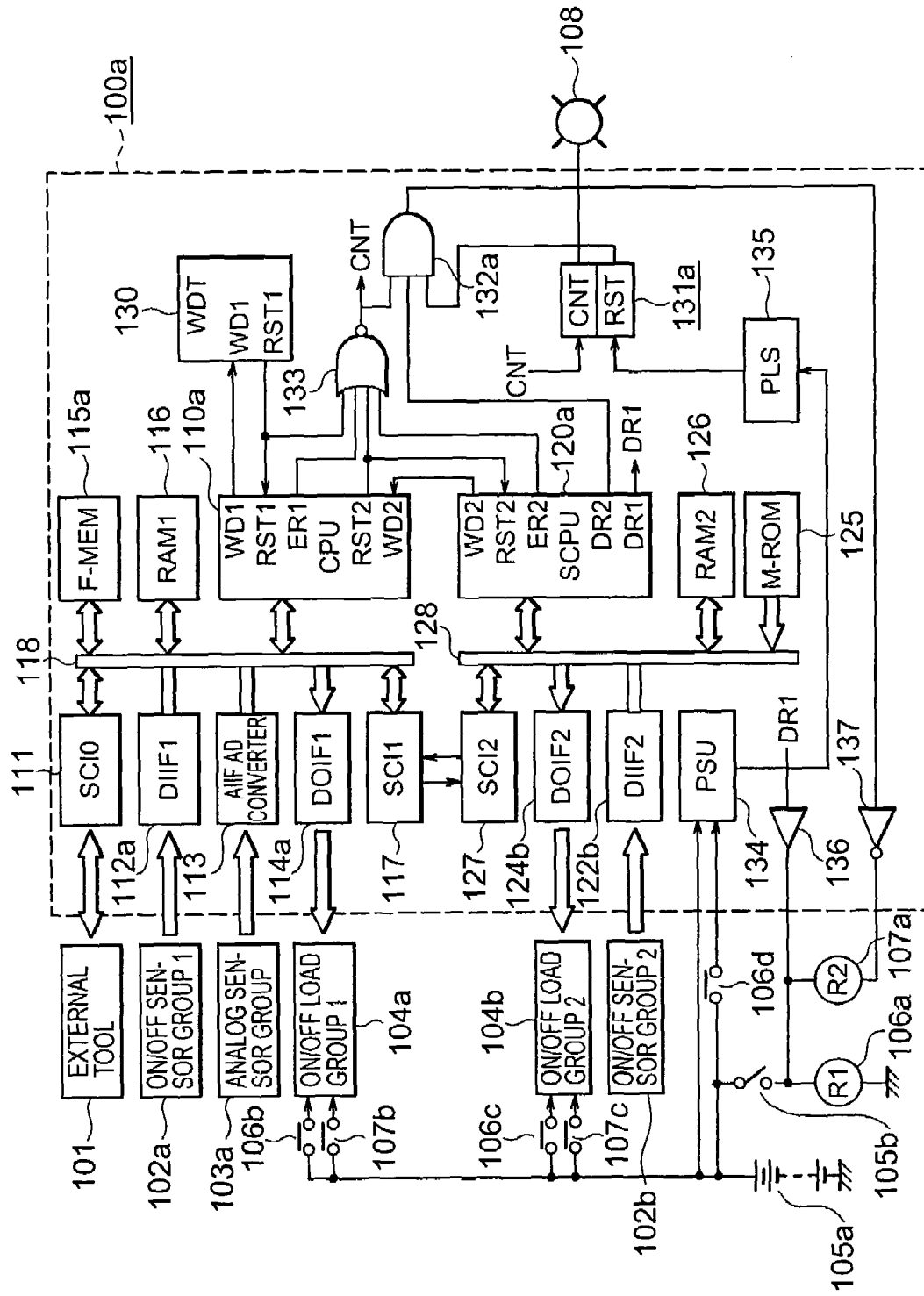
FIG. 1 is a block diagram showing an entire configuration of an on-vehicle electronic control device according to Embodiment 1 of the present invention.

FIG. 1 is a block diagram showing an entire configuration of the on-vehicle electronic control device according to Embodiment 1 of the present invention. An on-vehicle electronic control device 100a shown in FIG. 1 is composed of a single electronic circuit board, and received in a hermetically sealed casing.

First, description is made of components connected to an outside of the on-vehicle electronic control device 100a. An external tool 101 is one of such components connected to the outside. At the time of shipping or maintenance/inspection of a product, the external tool 101 is connected to the on-vehicle electronic control device 100a through a not-shown detachable connector, and transfers and writes a control program and a control constant to a nonvolatile program memory 115a described later.

In addition, a first on-vehicle sensor group 102a and a second on-vehicle sensor group 102b for ON/OFF actions are also connected to the outside of the on-vehicle electronic control device 100a. The first on-vehicle sensor group 102a includes, for example, an engine speed sensor, a crank angle sensor, and a vehicle speed sensor, which are operated at relatively high speed and high frequency, and whose signals need to be directly received by a microprocessor described later. The second on-vehicle sensor group 102b includes, for example, a selector switch for detecting a gear-shift lever position and an air-conditioning switch, which are operated at relatively low frequency. The microprocessor therefore scarcely causes problems due to delay in receiving signals therefrom.

An on-vehicle analog sensor group 103a is also connected to the outside. The on-vehicle analog sensor group 103a includes, for example, an accelerator position sensor, a throttle position sensor, a coolant temperature sensor, an oxygen concentration sensor, and air flow sensor.

Further, a first on-vehicle electric load group 104a and a second on-vehicle electric load 104b for ON/OFF actions are connected to the outside as well.

The first on-vehicle electric load group 104a performs operations for, for example, an ignition coil drive output for an engine, an output for driving a fuel injection control electromagnetic valve, a motor for controlling a valve opening degree of an air supply throttle, etc., which are performed at relatively high frequency. Thus, the first on-vehicle electric load group 104a is an electric load group for ON/OFF actions required to generate a drive output without delay.

The second on-vehicle electric load group 104b performs operations for, for example, an electromagnetic clutch drive output for an air conditioner, an display/alarm output, etc., which are performed at relatively low frequency. Thus, the second on-vehicle electric load group 104b is an electric load group for ON/OFF actions causing few problems of a drive output due to its delayed response.

Also connected to the outside as well are an on-vehicle battery 105a, a power switch 105b such as an ignition switch, a power relay 106a having output contacts 106b, 106c, and 106d, and a load power relay 107a having output contacts 107b and 107c.

The above-mentioned power relay 106a is energized from the on-vehicle battery 105a via the power switch 105b, and closes power circuits with respect to the first on-vehicle electric load group 104a and the second on-vehicle electric load group 104b via the output contacts 106b and 106c, respectively. At the same time, the power relay 106a uses the output contact 106d to close a power supply circuit for supplying power from the on-vehicle battery 105a to the on-vehicle electronic control device 100a.

Note that the on-vehicle battery 105a and the on-vehicle electronic control device 100a are provided with a direct connection circuit for supplying power during a sleep mode even when the power switch 105b is open.

Similarly, power circuits are closed with respect to parts of the first on-vehicle electric load group 104a and the second on-vehicle electric load group 104b via the output contacts 107b and 107c of the load power relay 107a, respectively.

An anomaly alarm/display device 108 is also connected to the outside, and is driven by the on-vehicle electronic control device 100a. The anomaly alarm/display device 108 is attached in a position that can be easily recognized by a driver visually.

Next, description will be made of an internal configuration of the on-vehicle electronic control device 10a. The internal configuration includes, for example, a microprocessor 110a composed of a 32-bit microprocessor, a serial-parallel converter 111 for a tool which is to be serially connected to the external tool 101, an interface circuit 112a for a directly inputted signal which is parallelly connected to the first on-vehicle sensor group 102a, a multi-channel AD converter 113 that is connected to the on-vehicle analog sensor group 103a, an interface circuit 114a for a directly outputted signal which is parallelly connected to the first on-vehicle electric load group 104a, the nonvolatile program memory 115a such as a flash memory, a RAM memory 116 for calculation processing, a first serial-parallel converter 117, and a data bus 118. The serial-parallel converter 111, the first serial-parallel converter 117, the multi-channel AD converter 113, the interface circuits 112a and 114a for directly inputted/outputted signals, the nonvolatile program memory 115a, the RAM memory 116, and the microprocessor 110a are connected to one another via the data bus 118. A component specified by a not-shown address bus or chip select circuit communicates with the microprocessor 110a.

The internal configuration of the on-vehicle electronic control device 100a further includes a concurrent control circuit. The concurrent control circuit includes, for example, an auxiliary microprocessor 120a composed of an 8-bit microprocessor, an interface circuit 122b for an indirectly inputted signal which is parallelly connected to the second on-vehicle sensor group 102b, an interface circuit 124b for an indirectly outputted signal which is parallelly connected to the second on-vehicle electric load group 104b, an non-volatile program memory 125 such as a mask ROM, an auxiliary RAM memory 126 for calculation processing, a second serial-parallel converter 127 that is serially connected to the first serial-parallel converter 117, and a data bus 128. The second serial-parallel converter 127, the interface circuits 122b and 124b for indirectly inputted/outputted signals, the nonvolatile program memory 125, the auxiliary RAM memory 126, and the auxiliary microprocessor 120a are connected to one another via the data bus 128. A component specified by a not-shown address bus or chip select circuit communicates with the auxiliary microprocessor 120a.

In addition, a watchdog timer 130 (a first runaway monitoring means) is provided in the internal configuration, and monitors a watchdog signal WD1 formed of a pulse train generated by the microprocessor 110a. When a pulse width of the watchdog signal WD1 exceeds (or becomes equal to or larger than) a predetermined value, the watchdog timer 130 generates a reset pulse RST1 to reactivate the microprocessor 110a.

The microprocessor 110a monitors a watchdog signal WD2 formed of a pulse train generated by the auxiliary microprocessor 120a. When a pulse width of the watchdog signal WD2 exceeds a predetermined value, the microprocessor 110a generates a reset pulse RST2 to reactivate the auxiliary microprocessor 120a, and also generates a first anomaly detection output ER1 that is described later.

The auxiliary microprocessor 120a generates a second anomaly detection output ER2 that is described later, a drive output DR1 for the power relay 106a, and a drive output DR2 for the load power relay 107a.

In addition, a counter 131a including a count input CNT and a reset input RST is provided in the internal configuration. When the number of times that a logical level of the count input CNT changes from "H" to "L" is equal to or more than a predetermined value, the counter 131a generates an anomaly storage output to drive the anomaly alarm/display device 108.

Further, a gate element 132a and a NOR element 133 are provided in the internal configuration. The NOR element 133 is connected so as to generate a synthetic output of the logical level "L" when any of the reset pulse RST1, the reset pulse RST2, the first anomaly detection output ER1, and the second anomaly detection output ER2 are operated, the synthetic output being the count input of the counter 131a, and set an output logical level of the gate element 132b to "L".

Power is supplied to a power supply unit 134 from the on-vehicle battery 105a directly or via the output contact 106d of the power relay 106a, and generates a stabilizing control power output to be used in the on-vehicle electronic control device 100a.

A power detection circuit 135 detects that the power switch 105b is closed, and supplies a pulse output to the reset input RST of the counter 131a to set the current count value of the counter 131a to 0 for initialization and clear the anomaly storage output.

An interface element 136 drives the power relay 106a by the drive output DR1 generated by the auxiliary microprocessor 120a, and continuously maintains the operation of the power relay 106a until the outputting of the drive output DR1 stops even if the power switch 105b is opened.

A NOT element 137 drives the load power relay 107a by the drive output DR2 generated by the auxiliary microprocessor 120a.

Note that when the power relay 106a is de-energized, the load power relay 107a is also de-energized, while even when the power relay 106a is energized, only the load power relay 107a is de-energized to cut off power supply to parts of the on-vehicle electric loads (which is realized by the load group stopping means).

FIGS. 2A and 2B show main memory maps used in the structure of FIG. 1. FIG. 2A shows a main memory map of the auxiliary nonvolatile program memory 125, and FIG. 2A shows a main memory map of the nonvolatile program memory 115a.

FIG. 2A shows an entire structure 200 of the auxiliary nonvolatile program memory 125 including data D0 to Dm respectively corresponding to addresses A0 to Am. Each of the data D0 to Dm is structured by combining binary numbers from a lower bit $b_0$ to an upper bit $b^*$.

The data Dm within the last address Am serves as internal checksum collation data. The collation data is obtained by, for example, adding the data D0 to Dm−1 for each digit by a binary operation to set the lowermost bit value of the addition result as a sum value of the corresponding digit. The addition operation thus performed for each digit is called a sum operation.

The checksum collation data at the time of being written into the auxiliary nonvolatile program memory 125 is called primitive collation data. Data obtained as a result of performing another sum operation as described above for the checksum is called current sum data. The primitive collation data may have changed due to a certain cause, so that the data stored in the address Am at the current time point is called current collation data.

The checksum includes an operation for calculating the current sum data by performing the sum operation, and an operation for comparing the obtained current sum data and the current collation data.

In the case where the addition sum operation for all the data D0 to Dm is performed according to the above-mentioned rule, a value of the total addition result becomes twice as large as the addition result of the data D0 to Dm−1, all the bits thus being 0.

Accordingly, instead of the above-mentioned comparing operation, it may be judged whether the total addition data becomes 0 or not. This method is called a simple checksum.

Further detailed description will be made with reference to FIG. 2A.

Command data 201 is used for an internal checksum instruction with respect to the microprocessor 110a.

Command data 202 is used for a trial calculation instruction with respect to the microprocessor 110a.

Trial calculation formula data 203 has contents including, for example, "Add an addend 20H to an augend 10H." The trial calculation formula data 203 is transmitted to the microprocessor 110a after the command data 202.

Correct answer data 204 provides an answer to the trial calculation formula data 203. A calculation comparison program 205 is used for performing an anomaly judgment by comparing the trial calculation result returned from the microprocessor 110a with the correct answer data 204.

Command data 206 is used for an external checksum instruction with respect to the microprocessor 110a. External collation data (a private cryptographic number) 207 is used for an external checksum. A comparison operation program 208 is used for the external checksum. The comparison operation program 208 performs an anomaly judgment by comparing the current sum data concerning the nonvolatile program memory 115a returned from the microprocessor 110a with the external collation data 207.

Note that the comparison operation program 208 is represented by fixed cryptographic numbers obtained as described later.

General programs 209 are additional general programs such as an input/output processing program, a transmission/reception program, and an output control program. Primitive collation data 210 is obtained by the sum operation for the data D0 to Dm−1.

FIG. 2B shows an entire structure 220 of the nonvolatile program memory 115a including data D0 to Dn respectively corresponding to addresses A0 to An.

An internal checksum program 221 (internal checksum means) is executed by the auxiliary microprocessor 120a to subject the nonvolatile program memory 115a to the sum operation and the comparison operation, or to the total addition sum operation and the 0 judgment that are used for the simple checksum.

A trial calculation execution program 222 is executed in response to the trial calculation instruction transmitted from the auxiliary microprocessor 120a. An external checksum program 223 is a program for performing the sum operation concerning the nonvolatile program memory 115a to generate the current sum data.

A function conversion program 224 is a program for function conversion described later. A runaway monitoring program 225 monitors the watchdog signal WD2 generated by the auxiliary microprocessor 120a, and generates the reset pulse RST2 when an anomaly occurs. General programs 226 are additional general programs such as the input/output processing program, the transmission/reception program, and the output control program. Correction data 227 is a correction data C-S1 calculated by subtracting intermediate sum data S1=ΣD(o~n~z), which is obtained by performing the sum operation for the data D0 to Dn−2 of the nonvolatile program memory 115a, from a cryptographic number C based on the function conversion program 224.

Further, primitive collation data S2 (reference numeral 228) for the internal checksum is obtained by the sum operation concerning the data D0 to Dn−1 of the nonvolatile program memory 115a. As is apparent from the following formula, the primitive collation data S2 (reference numeral 228) is equal to the cryptographic number C.

$$S2 = \Sigma D(0 \text{ to } n-1)$$
$$= \Sigma D(0 \text{ to } n-2) + Dn - 1$$
$$= S1 + (C - S1) = C$$

In the case where a mask ROM in which the electric write cannot be performed is used as the auxiliary nonvolatile program memory 125, contents of the mask ROM may hardly change during the operation of the control device, thereby exhibiting a feature that it may be only once at the time of operation start that the auxiliary microprocessor 120a performs the internal checksum concerning the auxiliary nonvolatile program memory 125.

However, when the contents of the auxiliary nonvolatile program memory 115a are changed, there occurs a problem in that the checksum external collation data stored in the auxiliary nonvolatile program memory 125 cannot be changed. The correction data 227 according to this embodiment is provide to cope with the problem. Even if the program contents of the nonvolatile program memory 115a are changed, the external collation data is fixed so as to be the cryptographic number C at all times.

Next, description will be made of the operations.

Figure 3:
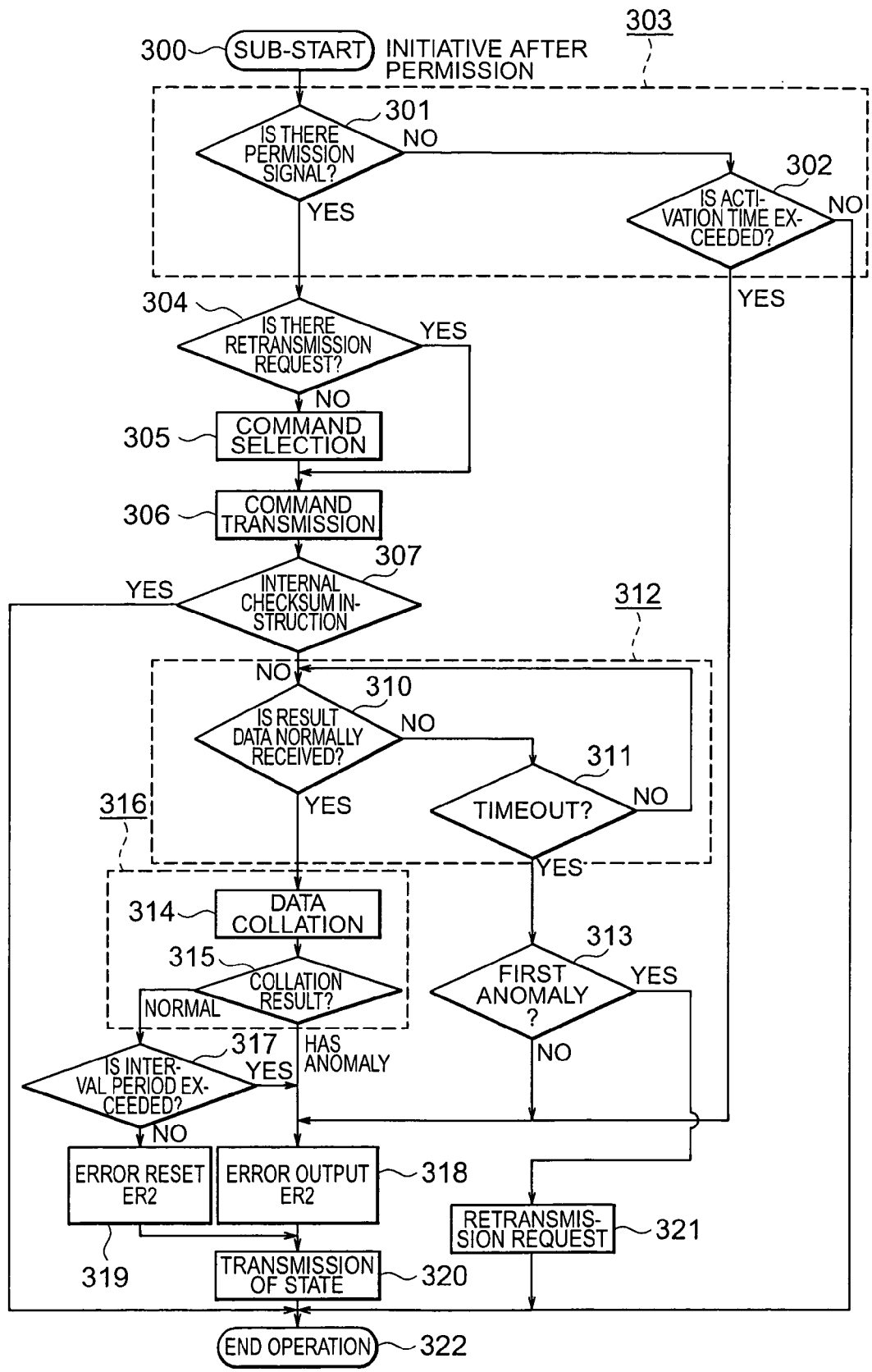
FIG. 3 is a flow chart showing a processing flow of a microprocessor diagnostic operation for an auxiliary microprocessor of the on-vehicle electronic control device shown in FIG. 1.

The on-vehicle electronic control device configured as shown in FIG. 1 according to Embodiment 1 of the present invention is first explained based on the flowchart of a microprocessor diagnostic operation shown in FIG. 3.

FIG. 3 is a flow chart showing the operation of the auxiliary microprocessor 120a having an initiative with respect to the diagnostic operation for the microprocessor 110a.

As shown in FIG. 3, first of all, in step 300 to be repeatedly activated, which is an operation start step, the operation of the auxiliary microprocessor 120a is started.

Next, in step 301, which starts following step 300, it is judged whether or not a permission signal to start the diagnostic operation is transmitted in advance from the microprocessor 110a to the auxiliary microprocessor 120a on the basis of the contents of a flag memory (not shown). When the judgement in step 301 indicates that the permission signal is not transmitted, it proceeds to step 302, and when judged that the permission signal is transmitted, it proceeds to step 304.

In step 302, which starts when the judgement in step 301 indicates that the permission signal is not transmitted, it is judged whether or not a predetermined period of time has elapsed after the power of the control device is turned on. Note that step 303 is operation start confirmation means composed of steps 301 and 302 described above.

In step 304, which starts when the judgement in step 301 indicates that the permission signal is transmitted, it is judged whether or not there is a retransmission request from the microprocessor 110a.

In step 305, which starts when judged in step 304 that there is no retransmission request, a command to be transmitted to the microprocessor 110a is selected. In this selection step, one of the internal checksum instruction 201, the trial calculation instruction 202, and the external checksum instruction 206, which are described using FIG. 2A, is sequentially selected in rotation, for example.

In step 306, which starts when the judgement in step 304 indicates that the microprocessor 110a transmits the retransmission request or which starts following step 305, the command selected in step 305 is transmitted. In the case where the retransmission request exists, the same command as that transmitted last time is transmitted again.

Next, instep 307, which starts following step 306, it is judged whether or not the transmitted command is the internal checksum instruction 201.

In step 310, which starts when the judgement in step 307 indicates that the transmitted command is not the internal checksum instruction, a checksum is performed concerning reply data from the microprocessor 110a that has responded to the trial calculation instruction 202 or the external checksum instruction 206 transmitted in step 306, and it is judged whether or not the reply data is normally received.

In step 311, which starts when the judgement in step 310 indicates that the reply data is not received, it is judged whether or not a predetermined period of time has elapsed after the command is transmitted in step 306 (timeout judgement). When judged in step 311 that the predetermined period of time has not elapsed, it returns to step 310.

Note that step 312 is downstream communication check means, which is composed of steps 310 and 311 described above and which is executed by the concurrent control circuit 120a. Step 310 is a checksum step for downstream communication information. Step 311 is a check step for response timeout.

In step 313, which starts when judged in step 311 that the timeout occurs, it is judged whether or not this timeout is the first timeout.

In step 314, which starts when the judgement in step 310 indicates that the reply data is normally received, the reply data from the microprocessor 110a and the correct answer data 204 or the external collation data 207 of FIG. 2A are collated and compared with each other. In this step, the comparison target is selected depending on whether the command transmitted in step 306 is the trial calculation instruction or the external checksum instruction.

In step 315, which starts following step 314, it is judged that there is no anomaly when the collation comparison result indicates "coincidence" between the data concerned.

On the contrary, it is judged that there is an anomaly when the collation comparison result indicates "non-coincidence".

Step 316 is trial calculation check means or external checksum means, which is composed of steps 314 and 315 described above and which is executed by the concurrent control circuit 120a.

In step 317, which starts when judged in step 315 that there is no anomaly, it is judged whether or not a time interval from the previous "no anomaly" judgement until the present "no anomaly" judgement, has exceeded a predetermined period of time. When the time interval has exceeded that period, an anomaly detection output is generated. Step 317 is interval monitoring means (a second runaway monitoring means).

In step 318, which starts when judged in step 302 that the predetermined period of time has elapsed after turning on the power of the control device, judged in step 313 that the timeout is not the first timeout anomaly, judged in step 315 that there is an anomaly in the collation, or judged in step 317 that the time interval has exceeded the predetermined period of time, a second anomaly detection output (error output) ER2 is generated.

In step 319, which starts when judged in step 317 that the time interval has not exceeded that period, the second anomaly detection output (error output) ER2 is reset.

In step 320, which starts following step 318 or 319 described above, transmitted to the microprocessor 110a is a state in which the second anomaly detection output is generated or reset.

In step 321, which starts when judged in step 313 that the timeout is the first timeout anomaly, a retransmission request is transmitted to the microprocessor 110a so that the microprocessor 110a retransmits the previous command.

In step 322, which starts when judged in step 302 that the predetermined period of time has not elapsed after turning on the power of the control device or judged in step 307 that the transmitted command is the internal checksum instruction, or which starts following step 320 or 321 described above, the operation ends. In this operation end step, it transits back to step 300 (operation start step) when other control operations are complete.

Figure 4:
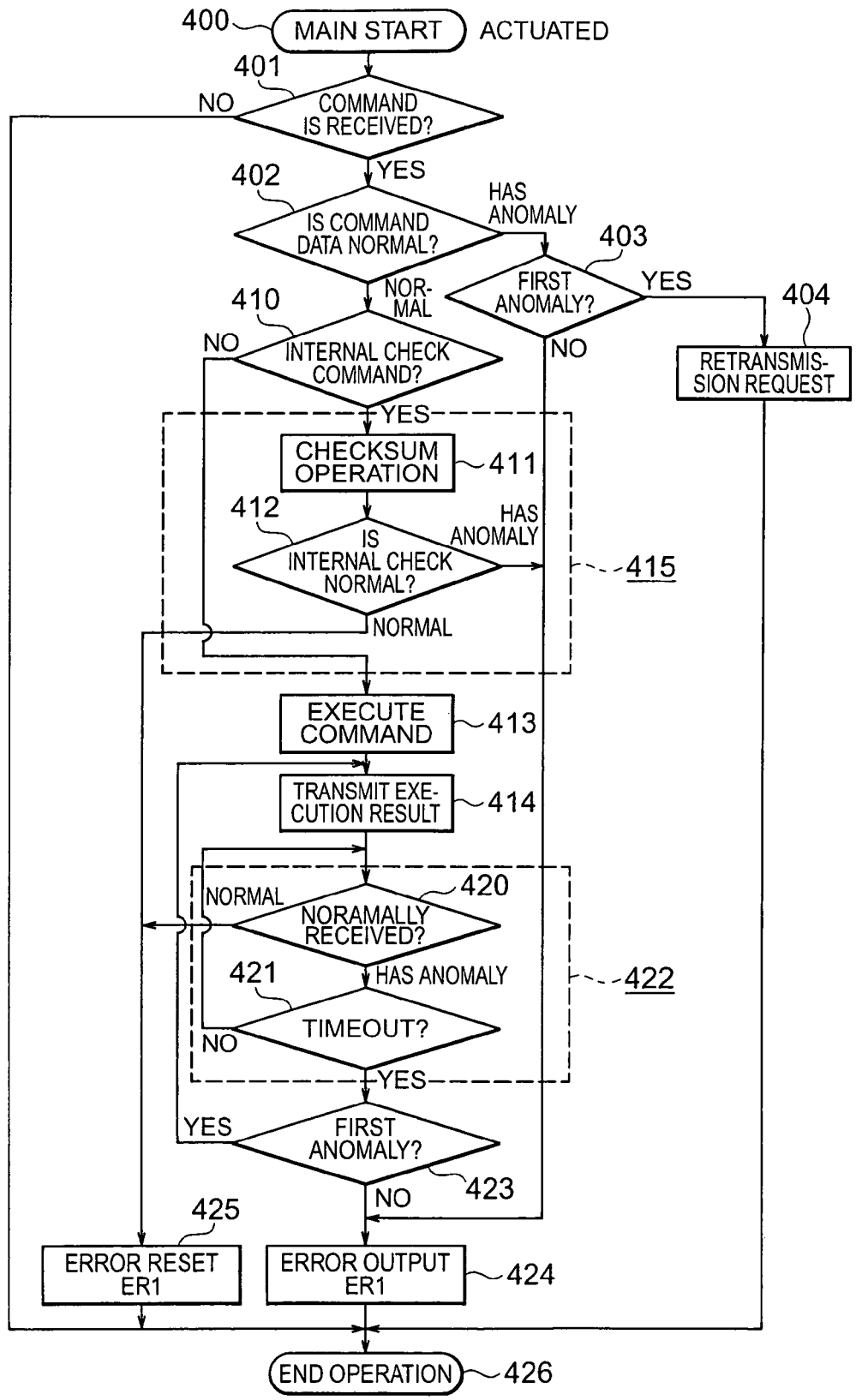
FIG. 4 is a flow chart showing a processing flow of a microprocessor diagnostic operation for a microprocessor per se of the on-vehicle electronic control device shown in FIG. 1.

The on-vehicle electronic control device configured as shown in FIG. 1 according to Embodiment 1 of the present invention is explained now based on the flowchart of the microprocessor diagnostic operation shown in FIG. 4.

FIG. 4 is a flow chart related to the diagnostic operation of the microprocessor 110a per se having no initiative concerning the diagnostic operation for the microprocessor 110a.

Referring to FIG. 4, in step 400 to be repeatedly activated, which is an operation start step, the diagnostic operation of the microprocessor 110a to be repeatedly activated is started.

Next, in step 401, which follows step 400, it is judged whether or not the microprocessor 110a receives a command transmitted from the auxiliary microprocessor 120a on the basis of the contents of a flag memory (not shown). When judged that the command is received, it proceeds to step 402. When judged that the command is not received, it proceeds to step 426 to end the operation.

In step 402, a checksum is performed on communication data including the received command, and it is judged whether or not the received data is normal. When judged that the command is normal, it proceeds to step 410. On the contrary, when judged that the command has an anomaly, it proceeds to step 403.

In step 403, it is judged whether or not the anomaly occurrence is the first occurrence. When judged that the anomaly occurrence is the first one, it proceeds to step 404, and when judged that the anomaly occurrence is not the first one, it proceeds to step 424.

In step 404, the microprocessor 110a transmits a retransmission request to the auxiliary microprocessor 120a.

In step 410, which starts when judged in step 402 that the received data is normal, it is judged whether or not the contents of the received command include a command for instructing the internal checksum. When judged that the contents include the command for the instruction, it proceeds to step 411. When judged that the contents do not include the command therefor, it proceeds to step 413.

In step 411, which starts when judged in step 410 that the contents include the command for instructing the internal checksum, current sum data is calculated by performing a sum operation concerning data stored in the nonvolatile program memory 115a.

Next, in step 412, it is judged whether or not the internal check is normal by way of collation comparison between the data calculated in step 411 and the collation data stored in the address An of FIG. 2B. Note that addition of all the data from A0 to An may be performed in step 411, and it may be judged in step 412 whether or not the addition value becomes 0.

Note that step 415 is the internal checksum means composed of steps 411 and 412 described above.

In step 413, which starts when judged in step 410 that the contents do not include the command for instructing the internal checksum, other commands transmitted from the auxiliary microprocessor 120a are executed.

As a result of the command execution in step 413, in step 414, which is a step of transmitting the result data of the trial calculation or the current sum data for the external checksum, the current sum data to be transmitted here becomes identical to the data S2=C stored in the address An if the contents of the nonvolatile program memory 115a are not changed.

In step 420, which starts following step 414, a checksum is performed to judge whether or not the data transmitted from the auxiliary microprocessor 120a in step 320 of FIG. 3 is normally received. When judged that the data is normally received, it proceeds to step 425. On the contrary, when judged that the data is not normally received, it proceeds to step 421.

In step 421, it is judged whether or not a predetermined period of time has elapsed after the transmission of the execution result in step 414. In step 421, when judged that no timeout occurs, it returns to step 420. When judged that the timeout occurs, it proceeds to step 423.

Note that step 422 is upstream communication check means, which is composed of steps 420 and 421 described above and which is executed by the microprocessor 110a.

In step 423, which starts when judged in step 421 that the timeout occurs, it is judged whether or not the anomaly occurrence is the first occurrence. When judged that the anomaly occurrence is the first occurrence, it returns to step 414 so that the execution result is retransmitted, and when judged that the anomaly occurrence is not the first occurrence, it proceeds to step 424.

In step 424, which starts when judged in step 403 that the anomaly occurrence is not the first occurrence, judged in step 412 that the internal checksum represents an anomaly, or judged in step 423 that the anomaly occurrence is not the first occurrence, the first anomaly detection output ER1 is generated.

In step 425, which starts when judged in steps 412 and 420 that no anomaly occurs, the first anomaly detection output ER1 is reset.

In step 426, which starts when judged in step 401 that the command is not received, or which starts following step 404, 424, or 425, the operation ends.

In this operation end step, it transits back to step 400 (operation start step) when other control operations are complete.

Based on the above description on the flow chart of the diagnostic operation, general description is made of operation in FIG. 1.

Referring to FIG. 1, the microprocessor 110a receives input signals from the first on-vehicle sensor group 102a, the second on-vehicle sensor group 102b, and the on-vehicle analog sensor group 103a, and controls the first and second on-vehicle electric loads 104a and 104b on the basis of the control program and the control constant stored in the nonvolatile program memory 115a. The second on-vehicle sensor group 102b and the second on-vehicle electric load 104b are in signal communication with the auxiliary microprocessor 120a serving as the concurrent control circuit, via the first and second serial-parallel converters 117 and 127.

However, analog signals dealing with slow operations performed by the coolant temperature sensor, an atmospheric pressure sensor, and the like among the on-vehicle analog sensor group 103a, may be connected to the concurrent control circuit side.

According to Embodiment 1 shown in FIG. 1, no analog output is dealt with, but it is possible to mount a DA converter for meter display as an indirect output if necessary.

Note that the number of outputs including such an analog output and a low speed ON/OFF action output is not so large in actuality. Therefore, the outputs do not need to depend on serial communication, and all the output signals may be directly outputted from the microprocessor 110a side.

Further, it is desirable that even for an input signal of the low speed operation, requisite minimum input information for maintaining the engine rotation does not depend on the serial communication and the input information is directly inputted to the microprocessor 110a.

The NOR element 133 is an OR element having inputs of the first anomaly detection output ER1, the second anomaly detection output ER2, the reset pulse RST1, and the reset pulse RST2 with the output inverted. If the inputs are concurrently generated, the counter 131a is adapted to count only 1.

This is based on an arrangement where anomalies occurring at the same time are assumed to be effected by the same cause. If necessary, the inputs may be counted to be added separately.

Further, in step 319 of FIG. 3 and step 425 of FIG. 4, the first and second anomaly detection outputs are reset when an anomaly is only a temporary one due to malfunction by noise forces. However, in the case where the anomaly continues, even when the counter 131a does not count up yet, the drive output DR2 is interrupted by the gate element 132a based on the output of the NOR element 133, thereby de-energizing the load power relay 107a.

Examples of the electric loads that are cut off of the power supply by the load power relay 107a include a motor for controlling a valve opening degree of an air supply throttle.

In addition, examples of the electric loads that may not be subjected to the power supply cut off but desirably stop driving include useful functions for safety such as a side monitoring control of a vehicle and an automobile steering control.

However, it is important to continuously operate the engine ignition control and fuel injection control as long as possible for safety travelling and evacuation travelling for the vehicle.

Therefore, even in the case where the runaway of the microprocessor 110*a* occurs due to malfunction by noise forces, the microprocessor is automatically reactivated with the reset pulse RST1.

If such a malfunction continues, a part of the above-mentioned electric loads is subjected to the drive stop by means of the counter 131*a*.

As described above, the on-vehicle electronic control device according to this embodiment includes: the concurrent control circuit that is serially connected to the microprocessor connected to the nonvolatile program memory via the bus; the watchdog timer; the collation information storage unit; the external checksum means; and the interval monitoring means. As a result, external runaway monitoring can be doubly performed on the microprocessor itself by the watchdog timer and the concurrent control circuit. Also, an external checksum can be performed on the nonvolatile program memory functioning in cooperation with the microprocessor. In addition to the external checksum, indirect communication check can be performed as to whether the concurrent control circuit undergoes normal communication or not. Accordingly, improvement is achieved for the reliability of the microprocessor, the nonvolatile program memory, and the concurrent control circuit.

In addition, the operation start confirmation means is provided, so that even in the case where the microprocessor has an initiative concerning the operation start of the external checksum, an anomaly is detected when the operation start instruction by the microprocessor is delayed, thereby obtaining an effect that the reliability of the on-vehicle electronic control device is improved in its entirety.

In addition, the direct/indirect input interface circuit, the direct/indirect output interface circuit, and the multi-channel AD converter are provided, so that not only the concurrent control circuit merely performs the external checksum on the microprocessor, but also an effect is obtained that the number of the input/output pins can be reduced to achieve the miniaturization and standardization.

In addition, the OR circuit, the power detection circuit, the counter, and the anomaly processing means are provided, so that the microprocessor is automatically reactivated upon the temporary malfunction due to noise forces or the like, and also in the case where the temporary malfunction continuously occurs, the operations of the electric loads having a safety problem are stopped, and can be normally recovered by temporarily opening the power switch 105*b* and then closing it again, thereby obtaining an effect that the reliability and convenience are improved.

In addition, the nonvolatile program memory includes the internal checksum collation data and the internal checksum program, so that the contents of the nonvolatile program memory are doubly checked by the external checksum and the internal checksum, thereby obtaining an effect that the reliability of the on-vehicle electronic control device is improved in its entirety.

In addition, the operation of the external checksum means is performed after the internal checksum means judges that there is no anomaly, so that the external checksum means is not operated when the internal checksum means judges that there is an anomaly, thereby obtaining an effect that the processing period of time of the microprocessor can be reduced in total.

In addition, the external checksum means and the internal checksum means are operated in the calculation cycles different from each other of the microprocessor, so that other controls can be intervened between the external checksum control and the internal checksum control, thereby obtaining an effect that the processing period of time of the microprocessor can be prevented from being excessively extended.

In addition, the upstream communication check means and the downstream communication check means are provided, so that in addition to the communication check function indirectly effected by performing the external checksum, the communication check is doubly performed, thereby obtaining an effect that the reliability of performance is improved, and also the anomaly factor can be identified.

In addition, the concurrent control circuit is composed of the auxiliary nonvolatile program memory and the auxiliary microprocessor and includes the runaway monitoring means operated by the microprocessor, so that even when the fixed control program is provided, a relatively complicated output control and the like can be performed through the concurrent control circuit, and the reliability concerning the concurrent control circuit is also improved owing to the runaway monitoring means. Furthermore, when the interval watchdog timer for the external checksum means is provided, the external runaway monitoring can be doubly performed on the concurrent control circuit, thereby obtaining an effect that further improvement of the reliability can be achieved.

In addition, the collation information storage unit is formed by using a part of the auxiliary nonvolatile program memory region, the checksum external collation data stored in the part of the region is composed of predetermined private cryptographic numbers, and the above-mentioned auxiliary nonvolatile program memory includes the function conversion program, so that even when the contents of the nonvolatile program memory are changed by changing the control specifications of the on-vehicle electronic control device and changing the control constants, the checksum external collation data can be composed of fixed values, whereby it is possible to use the mask ROM in which electric write cannot be performed, as the auxiliary nonvolatile program memory. In this case, it is unnecessary to perform a checksum on the nonvolatile program memory in general, but the check may be performed at the operation start as needed to obtain an effect that the sufficient reliability of performance can be secured.

In addition, the collation information storage unit or the auxiliary nonvolatile program memory includes, in addition to the checksum external collation data, the trial calculation formula data for the microprocessor and the correct answer data for the trial calculation formula, and further the auxiliary nonvolatile program memory includes the calculation check program executed by the auxiliary microprocessor, so that the auxiliary nonvolatile program memory can function as the external diagnosis of the microprocessor and perform confirmation as to whether or not the principal control routines are operated other than the runaway monitoring even if the auxiliary nonvolatile program memory has the trial calculation program with limited functions. Furthermore, it is unnecessary for the auxiliary microprocessor to include the trial calculation execution program, and the microprocessor operations are inspected by means of the complicated trial calculation execution program, thereby obtaining an effect that the reliability of performance is further improved.

Embodiment 2

Hereinafter, description will be made of components different from those of FIG. 1, based on FIG. 5 that is a block diagram showing an entire configuration of an on-vehicle electronic control device according to Embodiment 2 of the present invention.

Figure 5:
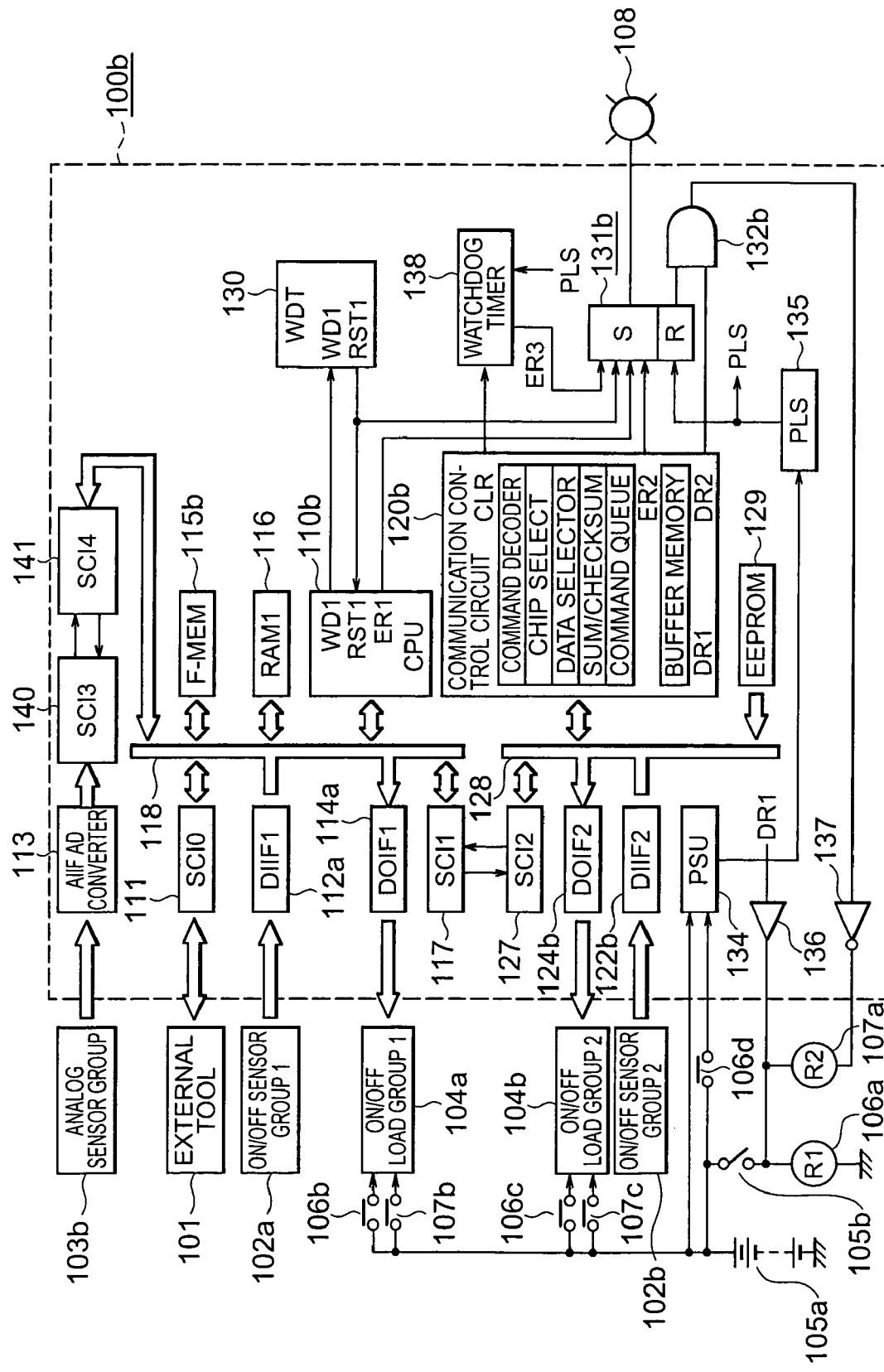
FIG. 5 is a block diagram showing an entire configuration of an on-vehicle electronic control device according to Embodiment 2 of the present invention.

In FIG. 5, an on-vehicle analog sensor group 103b is connected to an on-vehicle electronic control device 100b. Outputs of the on-vehicle analog sensor group 103b are converted into digital values by the multi-channel AD converter 113, and then are inputted to the data bus 118 of a microprocessor 110b via a pair of third serial-parallel converters 140 and 141.

For example, the microprocessor 110b is composed of a 32-bit microprocessor, and a nonvolatile program memory 115b is composed of a nonvolatile program memory such as a flash memory. The nonvolatile program memory 115b includes the internal checksum program 221, the external checksum program 223, and the programs 226 for the input/output processing, transmission/reception, and output control, which are shown in FIG. 2B.

The communication control circuit 120b is a concurrent control circuit for mainly performing communication control, which functions as substituting means for the above-mentioned auxiliary microprocessor 120a (the communication control circuit 120b may be referred to as the concurrent control circuit 120b below). A memory 129 is composed of a nonvolatile memory such as an EE-PROM that is used as collation information storage unit. The memory 129 and the communication control circuit 120b are both connected to the data bus 128.

An anomaly storage circuit 131b is a circuit that is used instead of the counter 131a described above. The anomaly storage circuit 131b drives the anomaly alarm/display device 108 by way of settings of the reset pulse RST1 that the watchdog timer 130 generates with respect to the microprocessor 110b, the first anomaly detection output ER1 that the microprocessor 110b generates, the second anomaly detection output ER2 that the concurrent control circuit generates, and a third anomaly detection output ER3 that a watchdog timer 138 described later generates. Then, the anomaly storage circuit 131b is reset by the output pulse from the power detection circuit 135.

A gate element 132b is connected between the drive output DR2 of the load power relay 107a and the NOT element 137. When the anomaly storage circuit 131b stores the anomaly, the gate element 132b has its output logical level set to "L" to stop the drive of the load power relay 107a.

Note that the drive outputs DR1 and DR2 are drive outputs for the power relay 106a and the load power relay 107a, and are also signal outputs generated by the concurrent control circuit 120b.

The concurrent control circuit 120b includes a buffer memory for data communication with the microprocessor 110b, a command decoder with respect to data transmitted from the microprocessor 110b, a command queue that is a table of commands to be transmitted to the microprocessor 110b, and a comparator circuit and adder circuit for performing a checksum for the transmission/reception data. The concurrent control circuit 120b is adapted to perform an equivalent operation of a microprocessor having a simple configuration.

The interval watchdog timer 138 performs monitoring on a time interval between clear signals CLR periodically generated by the concurrent control circuit 120b, and when the time interval exceeds a predetermined period of time, the interval watchdog timer 138 generates the third anomaly detection output ER3. The interval watchdog timer 138 is reset by the output pulse from the power detection circuit 135 at the time of turning on the power. Other configurations are the same as those of Embodiment 1, and description thereof is omitted here.

Next, description will be made of the operations.

Figure 6:
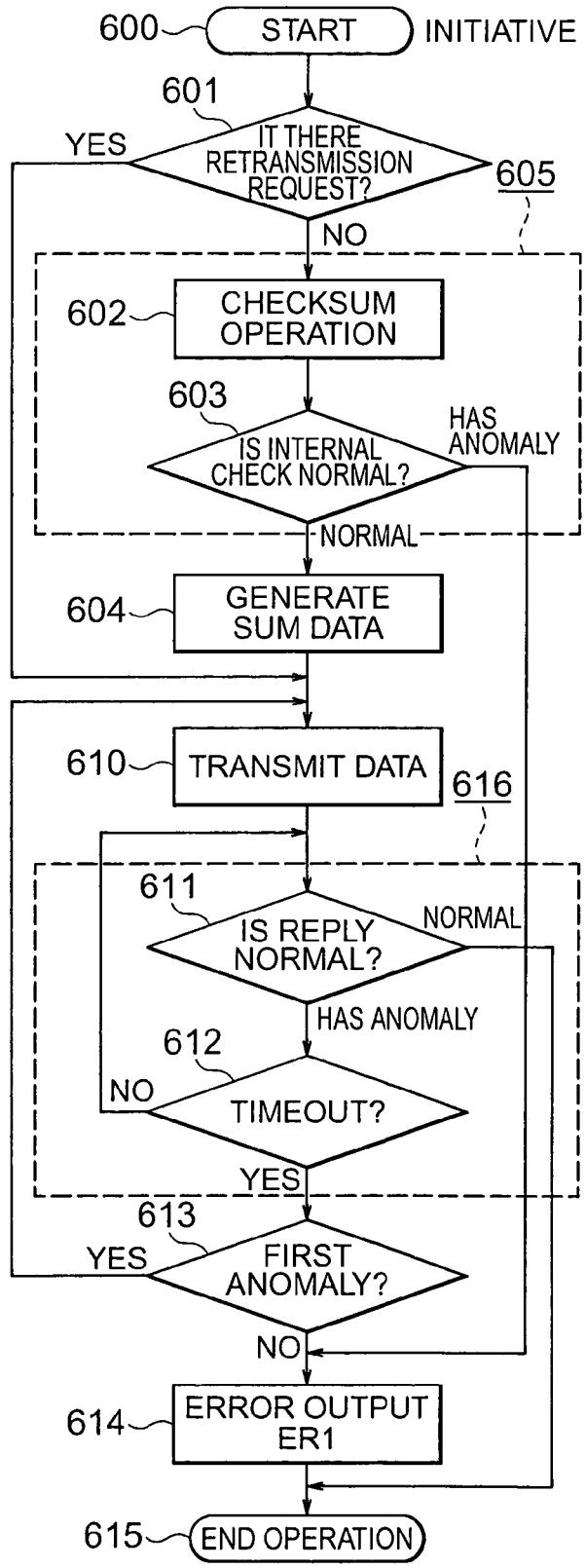
FIG. 6 is a flow chart showing a processing flow of a microprocessor diagnostic operation for a microprocessor per se of the on-vehicle electronic control device shown in FIG. 5.

The on-vehicle electronic control device configured as shown in FIG. 5 according to Embodiment 2 of the present invention is first explained based on the flow chart of a microprocessor diagnostic operation shown in FIG. 6.

FIG. 6 is a flow chart related to the diagnostic operation of the microprocessor 110b per se having an initiative concerning the diagnostic operation for the microprocessor 110b.

As shown in FIG. 6, first of all, in step 600 to be repeatedly activated, the diagnostic operation of the microprocessor 110b is started.

Next, in step 601, it is judged whether or not a retransmission request is transmitted from the concurrent control circuit 120b to the microprocessor 110b on the basis of the contents of a flag memory (not shown). When the judgement in step 601 indicates that the retransmission request is transmitted, it proceeds to step 610, and when judged that there is no retransmission request, it proceeds to step 602.

In step 602, current sum data is obtained by performing a sum operation for the nonvolatile program memory 115b.

In step 603, which starts following step 602, the internal checksum collation data 228 of FIG. 2B and the above current sum data are compared with each other to be judged. However, if the sum operation for all the data of FIG. 2B is performed in step 602, it is sufficient that the comparison judgement is performed as to whether or not the total additional value becomes 0.

Note that step 605 is internal checksum means composed of steps 602 and 603 described above.

In step 604, which starts when judged in step 603 that there is no anomaly, current sum data is obtained by performing a sum operation for the nonvolatile program memory 115b. However, if the same sum operation as that of step 602 is performed in step 602, the current sum data at this time can be used as it is.

In step 610, which starts when judged in step 601 that the retransmission request is transmitted or which starts following step 604, the current data generated at the previous time or the current data generated at this time in step 604 is transmitted to the concurrent control circuit 120b.

Next, in step 611, it is judged whether or not a reply is normally transmitted from the concurrent control circuit 120b. When judged that there is no anomaly in the transmission, it proceeds to step 615, and when judged that there is an anomaly, it proceeds to step 612.

In step 612, it is judged whether or not a predetermined period of time has elapsed after the current sum data is transmitted in step 610 (timeout judgement). When judged that the predetermined period of time has not elapsed in step 610, it returns to step 611.

Note that step 616 is communication check means composed of steps 611 and 612 described above.

When judged in step 612 that the timeout occurs, it proceeds to step 613, where it is judged whether or not this timeout is the first timeout anomaly.

When judged in step 613 that the timeout of step 602 is the first anomaly, it returns to step 610 for retransmission of the current sum data.

In step 614, which starts when judged in step 603 that an anomaly occurs in the internal checksum or judged in step 613 that the anomaly is not the first anomaly, the first anomaly detection output ER1 is generated.

In step 615, which starts when judged in step 611 that the reply is normally transmitted or which starts following step 614, the operation ends. In this operation end step, it transits back to step 600 (operation start step) when other control operations are complete.

In the on-vehicle electronic control device configured as shown in FIG. 5 according to Embodiment 2 of the present invention, description will be made of the flow chart of a diagnosis operation shown in FIG. 7 that represents an equivalent control operation of the concurrent control circuit 120b.

Figure 7:
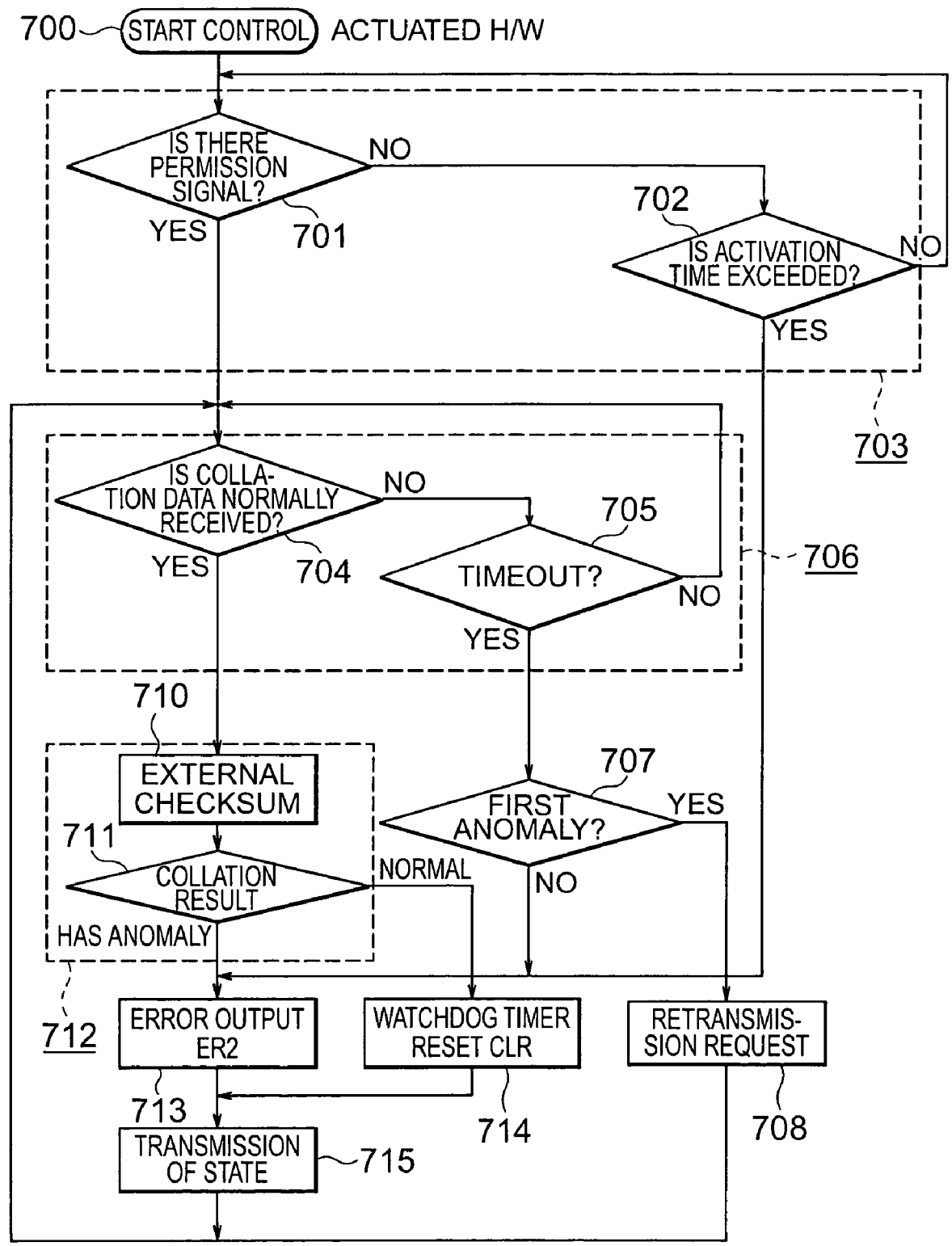
FIG. 7 is a flowchart showing a control operation of a concurrent control circuit of the on-vehicle electronic control device shown in FIG. 5 in an equivalent manner.

In FIG. 7, first, in step 700 is a primary step in which, activation is performed along with the start of power supply. Next, in step 701, it is judged whether or not a permission signal to start the diagnostic operation is transmitted in advance from the microprocessor 110b to the concurrent control circuit 120b on the basis of the contents of a flag memory (not shown). When judged that the permission signal is transmitted, it proceeds to step 704, and when judged that the permission signal is not transmitted, it proceeds to step 702.

In step 702, it is judged whether or not a predetermined period of time has elapsed after the power of the control device is turned on.

Note that step 703 is operation start confirmation means composed of steps 701 and 702 described above.

When the judgement result in step 702 indicates that the predetermined period of time has not elapsed, it returns to step 701. On the other hand, when judged that the predetermined period of time has elapsed, it proceeds to step 713 described later.

In step 704, which starts when judged on the basis of the judgement result in step 701 that the permission signal is transmitted in advance, it is judged whether or not the current sum data transmitted from the microprocessor 110b in step 610 of FIG. 6 is normally received. When judged that the data is normally received, it proceeds to step 710, and when judged the data is not normally received, it proceeds to step 705.

In step 705, it is judged whether or not a predetermined period of time has elapsed after judged in step 704 that the data is not normally received. When judged that the predetermined period of time has not elapsed, it returns to step 704, and when judged the predetermined period of time has elapsed, it proceeds to step 707.

Note that step 706 is downstream communication check means composed of steps 704 and 705 described above.

In step 707, which starts when judged in step 705 that the timeout occurs, it is judged whether or not this timeout is the first timeout. When judged that the timeout is the first anomaly, it proceeds to step 708, and when judged the timeout is not the first anomaly, it proceeds to step 713.

In step 708, a retransmission request of the current sum data is transmitted to the microprocessor 110b.

In step 710, which starts when the judgement in step 704 indicates the normal transmission of the permission signal, the current sum data transmitted from the microprocessor 110b and the external collation data stored in collation information storage unit 129 are compared with each other.

Next, in step 711, it is judged that there is no anomaly when the collation comparison result indicates "coincidence" between the data concerned. On the contrary, it is judged that there is an anomaly when the collation comparison result indicates "non-coincidence". When judged that there is no anomaly, it proceeds to step 714, and when judged that there is an anomaly, it proceeds to step 713.

Note that, in FIG. 7, step 712 is external checksum means composed of steps 710 and 711 described above.

In step 713, which starts when judged in step 702 that the predetermined period of time has elapsed after turning on the power of the control device, judged in step 707 that the timeout is not the first timeout anomaly, or judged in step 711 that the collation anomaly exists, a second anomaly detection output (error output) ER2 is generated.

On the other hand, in step 714, which starts when judged in step 711 that there is no collation anomaly, the clear signal CLR is transmitted to the interval watchdog timer 138 shown in FIG. 5.

In step 715, which starts following step 713 or 714, data concerning the presence or absence of the anomaly detection is transmitted to the microprocessor 110b.

Note that after proceeding through step 708 or 715, it returns to step 704.

Based on the above description on the flow chart of the diagnostic operation, general description is made of operation in FIG. 5.

Referring to FIG. 5, the microprocessor 110b receives input signals from the first on-vehicle sensor group 102a, the second on-vehicle sensor group 102b, and the on-vehicle analog sensor group 103b, and controls the first and second on-vehicle electric loads 104a and 104b on the basis of the control program and the control constant stored in the nonvolatile program memory 115b. The second on-vehicle sensor group 102b and the second on-vehicle electric load 104b are in signal communication with the concurrent control circuit 120b via the first and second serial-parallel converters 117 and 127.

Signals of on-vehicle analog sensor group 103b are inputted to the microprocessor 110b via the third serial-parallel converters 140 and 141.

The anomaly storage circuit 131b functions as an OR element of the first and second anomaly detection outputs ER1 and ER2, the reset pulse RST1, and the third anomaly detection outputs ER3 of the interval watchdog timer 138. Once at least one of these anomaly detection outputs and the reset pulse is generated, the anomaly storage operation starts.

Examples of the electric loads that are cut off of the power supply by the load power relay 107a include a motor for controlling a valve opening degree of an air supply throttle.

In addition, examples of the electric loads that may not be subjected to the power supply cut off but desirably stop driving include useful functions for safety such as a side monitoring control of a vehicle and an automobile steering control.

However, it is important to continuously operate the engine ignition control and fuel injection control as long as possible for safety travelling and evacuation travelling for the vehicle.

Therefore, even in the case where the runaway of the microprocessor 10b occurs due to malfunction by noise forces, the microprocessor is automatically reactivated with the reset pulse RST1.

However, in order to recover the anomaly storage, it is only after temporarily opening the power switch 105b that the power switch is then closed again. Therefore, a vehicle driver can recognize the anomaly occurrence and recover from the anomaly state by temporarily opening the power switch 105b and then closing it again.

As described above, similarly to Embodiment 1, the on-vehicle electronic control device according to this embodiment includes: the concurrent control circuit that is serially connected to the microprocessor connected to the nonvolatile program memory via the bus; the watchdog timer; the collation information storage unit; the external checksum means; and the interval monitoring means. As a result, external runaway monitoring can be doubly performed on the microprocessor itself by the watchdog timer and the concurrent control circuit. Also, an external checksum can be performed on the nonvolatile program memory functioning in cooperation with the microprocessor. In addition to the external checksum, indirect communication check can be performed as to whether the concurrent control circuit undergoes normal communication or not. Accordingly, improvement is achieved for the reliability of the microprocessor, the nonvolatile program memory, and the concurrent control circuit.

In addition, the interval monitoring means includes the power detection circuit and the interval watchdog timer, so that the external runaway monitoring can also be performed on the concurrent control circuit, thereby obtaining an effect that the reliability of the on-vehicle electronic control device is improved in its entirety.

In addition, the operation start confirmation means is provided, so that even in the case where the microprocessor has an initiative concerning the operation start of the external checksum, an anomaly is detected when the operation start instruction by the microprocessor is delayed, thereby obtaining an effect that the reliability of the on-vehicle electronic control device is improved in its entirety.

In addition, the direct/indirect input interface circuit, the direct/indirect output interface circuit, and the multi-channel AD converter are provided, so that not only the concurrent control circuit merely performs the external checksum on the microprocessor, but also an effect is obtained that the number of the input/output pins can be reduced to achieve the miniaturization and standardization.

In addition, the power detection circuit, the anomaly storage circuit, and the anomaly processing means are provided, so that the microprocessor is automatically reactivated upon the temporary malfunction due to noise forces or the like, and also the operations of the electric loads having a safety problem are stopped, and can be normally recovered by temporarily opening the power switch and then closing it again, thereby obtaining an effect that the reliability and convenience are improved.

In addition, the nonvolatile program memory includes the internal checksum collation data and the internal checksum program, so that the contents of the nonvolatile program memory are doubly checked by the external checksum and the internal checksum, thereby obtaining an effect that the reliability of the on-vehicle electronic control device is improved in its entirety.

In addition, the upstream communication check means and the downstream communication check means are provided, so that in addition to the communication check function indirectly effected by performing the external checksum, the communication check is doubly performed, thereby obtaining an effect that the reliability of performance is improved, and also the anomaly factor can be identified.

Embodiment 3

In the on-vehicle electronic control device according to Embodiment 1 shown in FIG. 1, the auxiliary microprocessor is used as the concurrent control circuit. Instead, when the concurrent control circuit does not perform complicated calculation processing, the auxiliary microprocessor may not be used.

To the contrary, in the on-vehicle electronic control device according to Embodiment 2 shown in FIG. 5, the microprocessor is not used as the concurrent control circuit. Instead, when the concurrent control circuit performs the complicated calculation processing, the auxiliary microprocessor may be used.

In the on-vehicle electronic control device according to Embodiment 1 shown in FIG. 1, the auxiliary microprocessor has the initiative in the anomaly diagnosis and the microprocessor secondarily operates. Instead, the initiative may be transferred to the microprocessor.

To the contrary, in the on-vehicle electronic control device according to Embodiment 2 shown in FIG. 5, the microprocessor has the initiative in the anomaly diagnosis and the concurrent control circuit secondarily operates. Instead, the initiative may be transferred to the concurrent control circuit.

Further, each of the embodiments of FIG. 1 and FIG. 5 may be realized regardless of whether the counter, the anomaly storage circuit, and the interval watchdog timer are configured by hardware or executed by software, or the like.

Further, the set time for the interval watchdog timer may be transmitted from the microprocessor, the interval monitoring time may also be stored in the collation information storage unit composed of the EE-PROM memory, and other such variations are possible.

Further, as the collation information storage unit, the checksum external collation data may be stored by using a jumper wire to open or close multi-bit switching means composed of printed patterns on an electronic board.

The internal checksum can be performed on the auxiliary nonvolatile memory by the auxiliary microprocessor as necessary. In the case where the auxiliary nonvolatile program memory is the mask ROM in which the electric write cannot be performed, the checksum is normally unnecessary. However, the internal checksum may be performed only at the time of operation start in the above case, thereby improving reliability.

As described above, the similar effects to those of Embodiments 1 and 2 can be obtained in Embodiment 3 as well.

What is claimed is:

1. An on-vehicle electronic control device, comprising:
a nonvolatile program memory;
a microprocessor which is connected to a first serial-parallel converter via a bus;
a concurrent control circuit which is serially connected to the microprocessor via the first serial-parallel converter and a second serial-parallel converter,
wherein the microprocessor and the concurrent control circuit function in cooperation to control an on-vehicle electric load group based on input signals from an on-vehicle sensor group and contents of the nonvolatile program memory;
characterized in that the on-vehicle electronic control device further comprises:
a watchdog timer into which a watchdog signal formed of a generated pulse train outputted by the microprocessor is inputted and which, when a pulse width of the watchdog signal is equal to or larger than a predetermined value, generates a reset pulse to reactivate the microprocessor;

a nonvolatile collation information storage means that is connected to the concurrent control circuit via a bus and previously stores predetermined checksum external collation data;

external checksum means for comparing current sum data that concerns data stored in the nonvolatile program memory and is transmitted to the concurrent control circuit from the microprocessor with the checksum external collation data that is previously stored in the collation information storage means, and generating an anomaly detection output when the current sum data does not coincide with the checksum external collation data;

interval monitoring means for generating the anomaly detection output when a time interval for execution by the external checksum means exceeds a predetermined time; and load group stopping means for stopping a partial drive of the on-vehicle electric load group in response to the anomaly detection output from at least one of the external checksum means and the interval monitoring means.

2. An on-vehicle electronic control device according to claim 1, wherein the interval monitoring means includes:

a power detection circuit operative to output a pulse upon turning on power to the microprocessor and the concurrent control circuit; and an interval monitoring timer that generates the anomaly detection output when an interval for clear signals supplied from the concurrent control circuit exceeds a predetermined time, and is reset by an output pulse from the power detection circuit.

3. An on-vehicle electronic control device according to claim 1, further comprising operation start confirmation means for enabling the interval monitoring means after the concurrent control circuit receives a permission signal for an external checksum from the microprocessor, and generating the anomaly detection output in a case where the permission signal for the external checksum cannot be received even if the predetermined time elapses after turning on power to the concurrent control circuit.

4. An on-vehicle electronic control device according to claim 1, wherein the on-vehicle sensor group includes: a first on-vehicle sensor group that is connected to the microprocessor; a second on-vehicle sensor group that is connected to the concurrent control circuit; and an analog sensor group for outputting analog signals, wherein the on-vehicle electric load group includes: a first on-vehicle electric load group that is connected to the microprocessor; a second on-vehicle electric load group that is connected to the concurrent control circuit, wherein the on-vehicle electronic control device further comprises:

a direct input interface circuit operative to connect the first on-vehicle sensor group to a data bus of the microprocessor;

an indirect input interface circuit operative to connect the second on-vehicle sensor group to a data bus of the concurrent control circuit;

a direct output interface circuit operative to connect the first on-vehicle electric load group to the data bus of the microprocessor;

an indirect output interface circuit operative to connect the second on-vehicle electric load group to the data bus of the concurrent control circuit; and a multi-channel AD converter that is connected to the data bus of at least one of the microprocessor and the concurrent control circuit, and digitally converts analog input signals from the analog sensor group sequentially, wherein the microprocessor and the concurrent control circuit functions in cooperation to control the first on-vehicle electric load group and the second on-vehicle electric load group in response to operations of the first on-vehicle sensor group, the second on-vehicle sensor group and the analog sensor group.

5. An on-vehicle electronic control device according to claim 1, further comprising:

a power detection circuit operative to output a pulse upon turning on power to the microprocessor and the concurrent control circuit;

an anomaly storage circuit that is driven by the anomaly detection output and the reset pulse generated by the watchdog timer, so as to generate an anomaly storage output, and reset into an initial condition by a generated pulse of the power detection circuit; and anomaly processing means for stopping a partial drive of the on-vehicle electric load group in response to an operation of the anomaly storage circuit, the anomaly processing means including a gate electrode and an anomaly alarm/display device.

6. An on-vehicle electronic control device according to claim 5, wherein the anomaly storage circuit further comprises:

an OR circuit operative to calculate a logical sum between the anomaly detection output and the reset pulse of the watchdog timer; and a counter that generates an anomaly storage output when the number of times of outputs from the OR circuit reaches a predetermined value, and is reset into an initial condition by an outputted pulse of the power detection circuit.

7. An on-vehicle electronic control device according to claim 5, wherein the nonvolatile program memory includes a control program comprising internal checksum collation data and internal checksum means, wherein the internal checksum collation data that includes one of a total addition value concerning data inside the nonvolatile program memory and the function value of the total additional value; and internal checksum means for detecting an anomaly by comparing between the total addition value concerning the data inside the nonvolatile program memory and the internal checksum collation data, the internal checksum means being operated by the microprocessor; and wherein the anomaly storage circuit generates an anomaly storage output in response to the anomaly detection output generated by the internal checksum means.

8. An on-vehicle electronic control device according to claim 7, wherein the nonvolatile program memory includes:

internal checksum collation data that includes one of a total addition value concerning data inside the nonvolatile program memory and the function value of the total additional value; and internal checksum means for detecting an anomaly by comparing between the total addition value concerning the data inside the nonvolatile program memory and the internal checksum collation data, the internal checksum means being operated by the microprocessor; and the counter counts an anomaly operation.

9. An on-vehicle electronic control device according to claim 7, wherein the external checksum means is operated after the internal checksum means judges that the contents of the nonvolatile program memory is normal, and is not operated when the internal checksum means detects the anomaly.

10. An on-vehicle electronic control device according to claim 7, wherein the external checksum means and the internal checksum means are operated in mutually different calculation cycles of the microprocessor;

wherein another control is intervened between the external checksum control and the internal checksum control.

11. An on-vehicle electronic control device according to claim 5, further comprising:

an upstream communication check means for performing a checksum for communication information transmitted from the concurrent control circuit to the microprocessor and response timeout check and generating the anomaly detection output, the upstream communication check means being operated by the microprocessor; and a downstream communication check means for performing a checksum for communication information transmitted from the microprocessor to the concurrent control circuit and response timeout check and generating the anomaly detection output, the downstream communication check means being operated by the concurrent control circuit, wherein the anomaly storage circuit generates an anomaly storage output in response to the anomaly detected by one of the upstream communication check means and the downstream communication check means.

12. An on-vehicle electronic control device according to claim 6, further comprising:

an upstream communication check means for performing a checksum for communication information transmitted from the concurrent control circuit to the microprocessor and response timeout check and generating the anomaly detection output, the upstream communication check means being operated by the microprocessor; and a downstream communication check means for performing a checksum for communication information transmitted from the microprocessor to the concurrent control circuit and response timeout check and generating the anomaly detection output, the downstream communication check means being operated by the concurrent control circuit, wherein the counter counts an anomaly operation.

13. An on-vehicle electronic control device according to claim 5, wherein the concurrent control circuit includes: an auxiliary nonvolatile program memory; and an auxiliary microprocessor that Operates based on contents of the auxiliary nonvolatile program memory, wherein the nonvolatile program memory includes a control program comprising:

runaway monitoring means for monitoring a watchdog signal formed of a generated pulse train from the auxiliary microprocessor and inputted into the microprocessor, and when a pulse width of the watchdog signal is equal to or larger than a predetermined value, causes the microprocessor to generate the reset pulse to reactivate the auxiliary microprocessor, wherein the anomaly storage circuit generates an anomaly storage output in response to the reset pulse generated by the runaway monitoring means.

14. An on-vehicle electronic control device according to claim 6, wherein the concurrent control circuit includes: an auxiliary nonvolatile program memory; and an auxiliary microprocessor that operates based on contents of the auxiliary nonvolatile program memory, wherein the nonvolatile program memory includes a control program comprising:

runaway monitoring means for monitoring a watchdog signal formed of a generated pulse train from the auxiliary microprocessor and inputted into the microprocessor, and when a pulse width of the watchdog signal is equal to or larger than a predetermined value, causes the microprocessor to generate the reset pulse to reactivate the auxiliary microprocessor, wherein the counter generates an anomaly storage output in response to the reset pulse generated by the runaway monitoring means.

15. An on-vehicle electronic control device according to claim 5, wherein the concurrent control circuit includes: an auxiliary nonvolatile program memory; and an auxiliary microprocessor that operates based on contents of the auxiliary nonvolatile program memory, the collation information storage means uses a partial region of the auxiliary nonvolatile program memory;

the checksum external collation data is stored in the partial region and includes a predetermined private cryptographic number;

the nonvolatile program memory includes a function conversion program; and the function conversion program performs a function conversion on the total addition value concerning the data inside the nonvolatile program memory such that the current sum data transmitted from the microprocessor to the auxiliary microprocessor coincides with the private cryptographic number.

16. An on-vehicle electronic control device according to claim 12, wherein:

the auxiliary nonvolatile program memory includes:

data of a trial calculation formula for the microprocessor;

correct answer data for the trial calculation formula; and a control program comprising a calculation check means executed by the auxiliary microprocessor;

the nonvolatile program memory includes a trial calculation execution program;

the data of the trial calculation formula is transmitted from the auxiliary microprocessor to the microprocessor;

the trial calculation execution program is executed by the microprocessor to return calculation result data based on the received data of the trial calculation formula to the auxiliary microprocessor; and the calculation check means is executed by the auxiliary microprocessor to compare between the received calculation result data and the correct answer data for judgment, generate the anomaly detection output when the received calculation result data does not coincide the correct answer data, and cause the anomaly storage circuit to generate an anomaly storage output in response to the anomaly detection output.

17. An on-vehicle electronic control device according to claim 12, wherein:
the auxiliary nonvolatile program memory includes:
data of a trial calculation formula for the microprocessor;
correct answer data for the trial calculation formula; and
a control program comprising a calculation check means executed by the auxiliary microprocessor;
the nonvolatile program memory includes a trial calculation execution program;
the data of the trial calculation formula is transmitted from the auxiliary microprocessor to the microprocessor;
the trial calculation execution program is executed by the microprocessor to return calculation result data based on the received data of the trial calculation formula to the auxiliary microprocessor; and
the calculation check means is executed by the auxiliary microprocessor to compare between the received calculation result data and the correct answer data for judgment, generate the anomaly detection output when the received calculation result data does not coincide the correct answer data, and cause the counter to perform a counting operation in response to the anomaly detection output.

* * * * *